A. KAYSER.

Assignor by Mesne Assignments to the Kayser Gas Generator Co,

CARBONIC ACID GAS-GENERATORS.

No. 7,854. Reissued Aug. 21, 1877.

Chas J. Buchheit
Ellsworth Nicholson } Witnesses

Adolph Kayser Inventor
by Edward Wilhelm
Attorney

N. PETERS, PHOTO-LITHOGRAPHER, WASHINGTON, D. C.

UNITED STATES PATENT OFFICE.

ADOLPH KAYSER, OF BUFFALO, N. Y., ASSIGNOR, BY MESNE ASSIGNMENTS, TO THE KAYSER GAS GENERATOR COMPANY.

IMPROVEMENT IN CARBONIC-ACID-GAS GENERATOR.

Specification forming part of Letters Patent No. 186,089, dated January 9, 1877; Reissue No. 7,854, dated August 21, 1877; application filed July 23, 1877.

*To all whom it may concern:*

Be it known that I, ADOLPH KAYSER, of the city of Buffalo, in the county of Erie and State of New York, have invented certain new and useful Improvements in Apparatus for Generating Carbonic-Acid Gas, which improvements are fully set forth in the following specification, reference being had to the accompanying drawings.

My invention relates to an apparatus designed to generate carbonic-acid gas automatically, and in which portions of the acid are alternately permitted to mix with the alkali solution, and are prevented from mixing therewith automatically, as the variations of pressure render necessary.

The nature of my invention will be fully understood from the following description.

Figure 1:
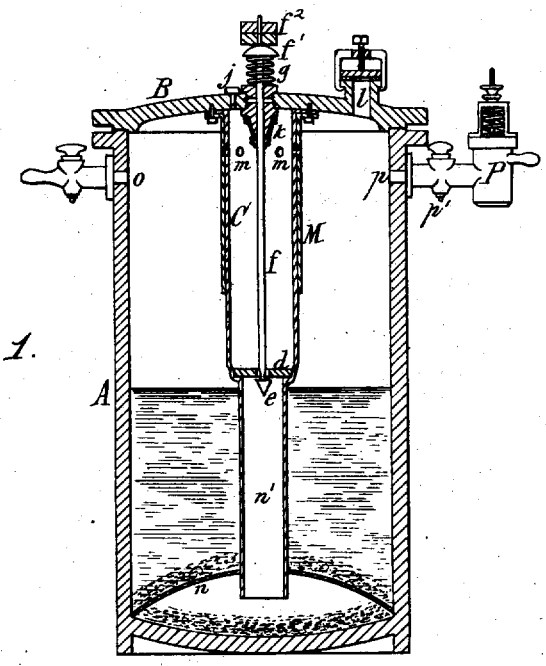
Figure 2:
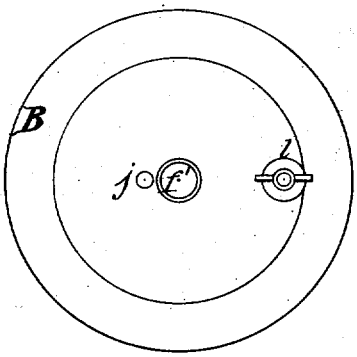
Figure 3:
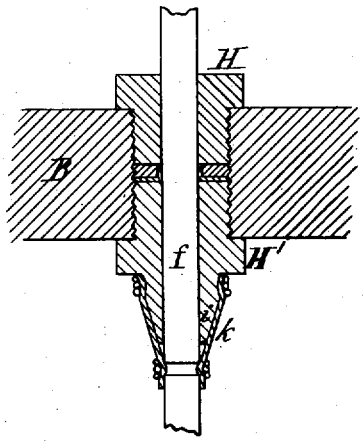

In the accompanying drawings, Figure 1 is a vertical section of my improved apparatus. Fig. 2 is a top plan view thereof. Fig. 3 is a detached sectional view, on an enlarged scale, of a portion of the valve-rod and cover of the apparatus.

Like letters of reference refer to like parts in each of the figures.

A represents the cylindrical body of the apparatus, constructed of wrought or cast iron, or any other suitable metal, and B the cover or top plate closing the upper end of the cylinder A. C is the acid-receptacle, constructed of sheet-lead, and secured to the under side of the cover B, so as to depend therefrom. *d* is the bottom of the acid-receptacle, composed of lead, glass, or other suitable material, and provided with a central opening, through which the acid is discharged. *e* represents the valve for regulating the discharge of the acid through this opening. It is secured to the lower end of the stem or rod *f*, so as to bear against the under side of the bottom *d* of the acid-reservoir, as clearly shown. The valve-stem *f* passes through an opening in the cover B, and is provided above the latter with a knob or disk, $f^1$, for conveniently operating it. *g* is a spiral spring, interposed between the knob $f^1$ and the cover B of the apparatus, so as to hold the valve *e* tightly against its seat. The stem *f* is guided in the cover B by two glands or sleeves, H H′, screwed into the cover B from opposite sides, and provided with an interposed packing, *h*. The lower sleeve H′ is constructed with an extension, *i*, to which is secured the upper end of a short tube or sleeve, *k*, of rubber or other flexible material, while the lower end of the tube K is secured to the valve-stem *f*. As shown in the drawings, the extension *i* and stem *f* are each provided with an annular groove, over which the ends of the rubber tube *k* are secured by winding wires around them, as clearly represented in Fig. 3. The pliability of the tube *k* permits the valve-stem, which fits loosely in the glands H H′, to be raised and lowered with great ease, while the tube forms a gas-tight connection between the two parts. *j* represents an opening formed in the cover B, for introducing the acid into the receptacle C. The opening *j* is closed by a screw-plug, as shown in Fig. 1, or in any other suitable manner.

M represents a cylinder, of cast or wrought iron, or similar material, inclosing the lead cylinder C, so as to prevent the same from being bent or otherwise displaced or injured in shipping the apparatus.

*m* represents openings formed in the upper part of the acid-reservoir C and inclosing-cylinder M, so as to admit the gas into the reservoir C, thereby equalizing the pressure in the acid-receptacle and generating-vessel, and permitting the free escape of the acid when the valve is opened.

*n* represents a perforated plate or diaphragm, arranged above the bottom of the cylinder A, so as to form a shallow chamber between them.

*n′* is a pipe secured to the under side of the bottom *d* of the acid-receptacle. It penetrates the perforated plate *n*, and terminates a short distance above the bottom of the cylinder A, as clearly shown in Fig. 1.

*l* is an opening formed in the cover B, for introducing the alkali into the cylinder A. It is closed by a suitable plate, held in place by a bail and set-screw in a common manner.

*o* represents the gas-escape aperture, through which the gas is taken from the apparatus under the full pressure. It is provided with a suitable faucet or valve for opening and closing it.

*p* represents a second gas-escape aperture, employed with apparatus designed to carry a high pressure—as, for instance, for making soda-water. It is also provided with a stop-cock or valve, *p'*, and leads to an automatic pressure-valve, P, by which the gas-pressure is reduced to a point at which it can be safely admitted to casks containing malt liquors and similar liquids without danger of causing them to leak, or interfering with the drawing off of the liquid.

In charging the apparatus the cylinder A is filled with water to within a short distance from the bottom of the acid-vessel, as represented in Fig. 1. A quantity of alkali, preferably bicarbonate of soda, suitable to the size of the apparatus, is then introduced through the opening *l*. A small portion of the alkali is dissolved by the water, while the greater portion thereof descends and settles upon the perforated plate *n*, or, passing through the openings thereof, lodges on the bottom of the cylinder. A proportionate quantity of sulphuric acid is then introduced into the receptacle C through the opening *j*, when both openings are securely closed. By pressing upon the knob $f^1$ the valve *e* is opened, when the acid escapes and is conducted by the tube *n'* directly to the space between the perforated plate *n* and the bottom of the cylinder A, where it comes in contact with the alkali and generates carbonic-acid gas. The gas so generated on the bottom of the apparatus rises through the superincumbent body of water charged with alkali, whereby it is thoroughly purified and accumulates in the upper portion of the cylinder A. The layer of alkali on the perforated plate *n* assists in preventing any of the sulphuric acid from being carried up by the gas into the washing-water, and insures the production of perfectly pure carbonic-acid gas.

When the desired quantity of sulphuric acid has been admitted to the vessel A the knob $f^1$ is released, when the valve *e* is closed by the spring *g*, and the generation of gas arrested. The stem *f* is pressed outward or upward by the gas-pressure acting upon the area of its cross-section, so that, by placing a weight or weights, $f^2$, upon the knob $f^1$ sufficient to counterbalance the desired gas-pressure, the action of the valve *e* is rendered automatic. When the gas-pressure sinks below the point at which it balances the weighted valve, the latter is opened, and sulphuric acid discharged until, by the generation of gas, sufficient pressure is produced to again close the valve.

The gas generated directly underneath the tube *n'* accumulates in the upper portion thereof, and displaces the alkali solution contained therein, so that the tube *n'* is filled, for the greater part of its height, with gas only.

By this means the acid discharged from the vessel C is enabled to reach the undissolved alkali on the bottom of the apparatus quicker and in a less diluted state than when it is allowed to descend through the entire body of alkali solution, thereby making the generation of gas instantaneous or immediately following the opening of the valve *e*, and the automatic operation of the apparatus very reliable and uniform. The valve *e* and stem *f* are preferably constructed of steel, and coated with lead, to prevent their corrosion by the sulphuric acid. The gas contained within the tube *n'* is subjected to a slight extra pressure, corresponding with the difference in the height of the liquid levels within and around the tube *n'*, whereby the gas in the tube *n'* is caused to press against the under side of the bottom of the acid-vessel C, and the valve *e* closing against the same, thereby holding valve *e* tightly against its seat, and preventing any leakage through the opening of the bottom of the acid-vessel.

Having thus fully described my invention, what I claim as new, and desire to secure by Letters Patent, is—

1. The combination, with the generating-vessel A B and acid-receptacle C, of the gas-tube *n'* depending from the under side of the acid-receptacle, and valve *e*, closing against the under side of the acid-receptacle, substantially as and for the purpose hereinbefore set forth.

2. The combination, with the generating-vessel A B and acid-receptacle C, and tube *n'*, of the valve *e*, closing against the under side of the acid-receptacle, valve-stem *f*, and spring *g*, arranged so as to hold the valve in a closed position, substantially as hereinbefore set forth.

3. The combination, with the generating-vessel A B and acid-receptacle C, of the gas-tube *n'*, leading from the bottom of the acid-receptacle to the lower portion of the generating-vessel, and valve *e*, constructed so as to be opened and closed automatically, as the variations of pressure render necessary, substantially as hereinbefore set forth.

4. The combination, with the generating-vessel A B and acid-receptacle C, of the perforated diaphragm *n*, gas-tube *n'*, opening into the space between the diaphragm *n* and the bottom of the vessel A, and automatic valve *e*, substantially as and for the purpose hereinbefore set forth.

5. The combination, with the generating-vessel A B and acid-reservoir C, of the valve and stem *e f*, spring *g* tending to close the valve, and weight or weights $f^2$ tending to open the valve, all arranged substantially as and for the purpose hereinbefore set forth.

A. KAYSER.

Witnesses:
EDWARD WILHELM,
CHAS. J. BUCHHEIT.